(12) United States Patent
Meckenstock et al.

(10) Patent No.: US 9,349,122 B2
(45) Date of Patent: *May 24, 2016

(54) SYSTEM AND METHOD FOR PROGRAMMING POINT OF SALE DEVICES

(71) Applicant: PAYMENTECH, LLC, Dallas, TX (US)

(72) Inventors: David T. Meckenstock, Arlington, TX (US); Juan E. Lopez, Garland, TX (US); Mark J. George, Tampa, FL (US); Diana E. Slavik, Plano, TX (US); Mark A. Lawler, Lewisville, TX (US); Robert C. Hansen, Crystal Falls, MI (US); Gregorio Colon, Arlington, TX (US); Lester L. Cooper, Frisco, TX (US)

(73) Assignee: PAYMENTECH, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,266

(22) Filed: Oct. 14, 2014

(65) Prior Publication Data

US 2015/0046275 A1 Feb. 12, 2015

Related U.S. Application Data

(63) Continuation of application No. 13/545,861, filed on Jul. 10, 2012, now Pat. No. 8,863,147, which is a continuation of application No. 12/343,197, filed on Dec. 23, 2008, now Pat. No. 8,220,003, which is a continuation of application No. 09/611,622, filed on Jul. 7, 2000, now Pat. No. 7,472,394.

(51) Int. Cl.
| | |
|---|---|
| *G06F 3/00* | (2006.01) |
| *G06Q 20/00* | (2012.01) |
| *G06Q 20/10* | (2012.01) |
| *G06F 9/54* | (2006.01) |
| *G06Q 30/02* | (2012.01) |
| *G06Q 20/20* | (2012.01) |
| *G07F 19/00* | (2006.01) |
| *G07G 1/00* | (2006.01) |
| *G07G 1/14* | (2006.01) |

(52) U.S. Cl.
CPC ............. *G06Q 20/108* (2013.01); *G06F 9/54* (2013.01); *G06Q 20/20* (2013.01); *G06Q 20/202* (2013.01); *G06Q 30/0238* (2013.01); *G07F 19/206* (2013.01); *G07G 1/0009* (2013.01); *G07G 1/14* (2013.01)

(58) Field of Classification Search
CPC .............................. G06F 9/54; G06Q 20/108
USPC ............................................. 719/310; 705/70
See application file for complete search history.

(56) References Cited

U.S. PATENT DOCUMENTS

| | | | | |
|---|---|---|---|---|
| 6,092,057 | A * | 7/2000 | Zimmerman et al. | 705/44 |
| 6,175,869 | B1 * | 1/2001 | Ahuja et al. | 709/226 |
| 6,560,604 | B1 * | 5/2003 | Fascenda | 707/999.01 |

OTHER PUBLICATIONS

Anthony, Using Design Patterns to Reveal the Competence of Object-Oriented Methods in System-Level Design, 1999.*

*Primary Examiner* — Lechi Truong
(74) *Attorney, Agent, or Firm* — Jackson Walker LLP; Christopher J. Rourk

(57) ABSTRACT

A system for programming point of sale devices is provided. The system includes a terminal programming system that can program point of sale devices provided by different manufacturers and having different proprietary operating systems. A communications interface is connected to the terminal programming system that receives update requests from the plurality of point of sale devices, such as when the point of sale devices call in to the system or when the point of sale devices respond to a poll.

22 Claims, 5 Drawing Sheets

SYSTEM AND METHOD FOR PROGRAMMING POINT OF SALE DEVICES

CROSS-REFERENCE TO RELATED APPLICATIONS

This application is a continuation of U.S. patent application Ser. No. 13/545,861, filed Jul. 10, 2012, now U.S. Pat. No. 8,863,147, which is a continuation of U.S. patent application Ser. No. 12/343,197, filed Dec. 23, 2008, now U.S. Pat. No. 8,220,003, which is a continuation of U.S. patent application Ser. No. 09/611,622, filed Jul. 7, 2000, now U.S. Pat. No. 7,472,394, which are hereby incorporated by reference for all purposes.

FIELD OF THE INVENTION

The present invention pertains to the field of payment data processing. More specifically, the invention relates to a system and method for programming point of sale devices that allows multiple devices that have operating systems provided by different manufacturers to be programmed by a single system and method.

BACKGROUND

Payment data processing is used to facilitate and maintain the reliability of electronic payment transactions. Such electronic payment transactions are typically initiated with a point of sale device or device. The point of sale device can be used to read a credit card number from data that is encoded in a magnetic stripe of the credit card. Alternatively, the credit card number can be manually entered by an operator into a terminal, or other forms of electronic payment devices and procedures can be used. Payment data and other suitable data, such as device identification data, is then included in the transaction record which is subsequently transmitted to a payment processor and ultimately to the financial institution that issued the credit card or other electronic payment device. Thus, the reliability of the data entered into the point of sale device is a cornerstone to the subsequent processing of electronic payment data.

There are presently many manufacturers of point of sale devices. It is commonplace for each different manufacturer to have a different operating system for its point of sale device, where the application and configuration data are typically a series of messages that can be downloaded onto the device after the device is installed at its operating location. Usually, an operator will set up the device according to instructions received with the device, and then will cause the device to contact a terminal management system that will then provide the device with data messages such as operating system software, application software, configuration data, and other suitable data and software.

Because each manufacturer has a different operating system, application software, and configuration data for its point of sale devices, it is commonplace for point of sale devices that are provided by different manufacturers to be managed by different terminal management systems, and even for different models of point of sale devices that are provided by the same manufacturer to be managed by different terminal management systems. While it is known that the terminal management systems for manufacturers with different device operating systems can be combined, combining the terminal management systems for multiple manufacturers has not been done, in part because of the incompatibility of the databases in which the device data for a given user's fleet of devices is stored. Such databases are often designed to different standards, which makes combining them difficult or impossible. In addition, as a database grows larger, it becomes more difficult to modify and back-up the database. Modifications to the database must typically be made while the database is offline, which means that the terminal management system is inoperable while the database is being modified. In addition, it is difficult to operate the database from more than one physical location, which increases the possibility that the database could be made unavailable due to a single component failure.

The inability to combine terminal management systems for multiple point of sale device manufacturers can result in problems when many different point of sale devices are owned and/or managed by an organization. The organization must typically operate physically separate facilities, or must configure the facilities so as to route the program requests to a suitable system for processing. Operator attention is frequently required to correct problems that arise from database incompatibility and unavailability.

SUMMARY OF THE INVENTION

In accordance with the present invention, a system and method for programming point of sale devices are provided that overcome known problems with programming point of sale devices.

In particular, a system and method for programming point of sale devices are provided that allow multiple point of sale devices which have operating systems provided by different manufacturers to be programmed by a single system and method.

In accordance with an exemplary embodiment of the present invention, a system for programming point of sale devices is provided. The system includes a terminal programming system that can program point of sale devices provided by different manufacturers and having different proprietary operating systems. A communications interface is connected to the terminal programming system that receives update requests from the plurality of point of sale devices, such as when the point of sale devices call in to the system or when the point of sale devices respond to a poll.

The present invention provides many important technical advantages. One important technical advantage of the present invention is a system and method for programming point of sale devices that is compatible with operating systems from two or more manufacturers. The present invention thus allows a single system to be used to program, update, and maintain point of sale devices, which helps to eliminate problems caused by having redundant databases.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
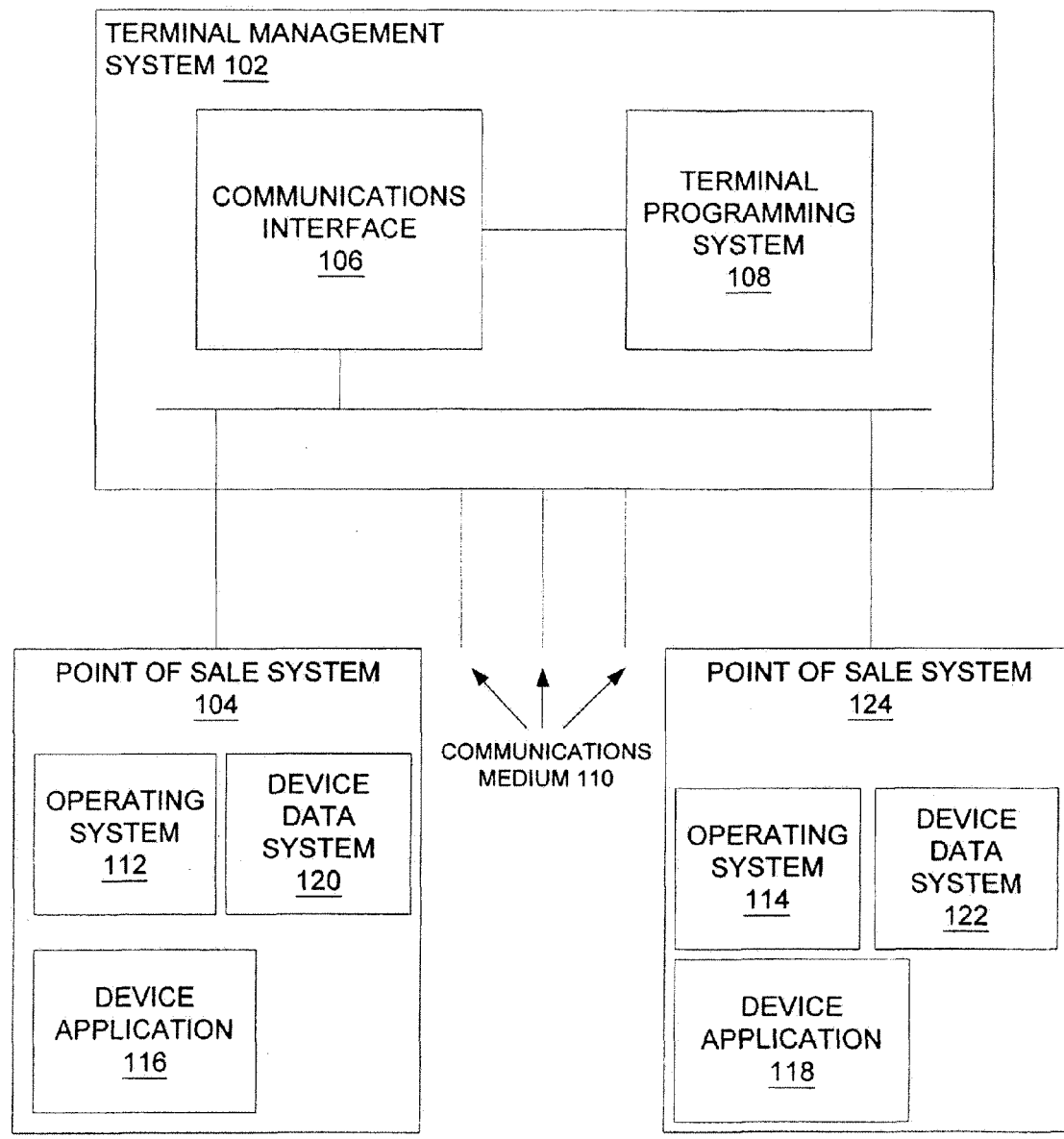
FIG. 1 is a diagram of a system for programming point of sale devices in accordance with an exemplary embodiment of the present invention.

In the description which follows, like parts are marked throughout the specification and drawings with the same reference numerals, respectively. The drawing figures may not be to scale and certain components can be shown in generalized or schematic form and identified by commercial designations in the interest of clarity and conciseness.

FIG. 1 is a diagram of a system 100 for programming point of sale devices, such as point of sale devices, in accordance with an exemplary embodiment of the present invention. System 100 allows point of sale devices from different manufacturers to be programmed from a single system, so as to reduce or eliminate the problems caused by having multiple point of sale device programming systems.

System 100 includes terminal management system 102, which can be implemented in hardware, software, or a suitable combination of hardware and software, and which can be one or more software systems operating on a general purpose server system. As used herein, a software system can include one or more lines of code, one or more objects, one or more agents, one or more subroutines, one or more separate lines of code operating in two or more separate software applications, or other suitable configurations of software. In one exemplary embodiment, a software system can include a first line of code operating in a general purpose software system, such as an operating system, and a second line of code operating in a specific purpose software application. Terminal management system 102 is used to control the provision of software and data to point of sale systems 104 through 124, which are two or more point of sale terminals made by two or more different manufacturers. For example, terminal management system 102 can allow point of sale systems 104 through 124 to randomly access operating system software, application software, configuration data, operating system updates, or troubleshooting on an as-needed basis. Likewise, terminal management system 102 can poll point of sale systems 104 through 124, such as by calling each point of sale system over the public switched telephone network, by transmitting predetermined data messages over the Internet to each of the point of sale systems 104 through 124, or by other suitable procedures.

Terminal management system 102 can provide several classes of data to point of sale systems 104 through 124. A first class of data is provided when point of sale systems 104 through 124 are initially configured for operation, such as after being installed in a facility by an operator. Operating system software, application software, configuration data or other suitable data can be provided for each point of sale system during initial configuration. For example, the point of sale system can receive data and programming that provides the point of sale system with telephone numbers, allowable card types, a merchant number for the merchant location, an address for the merchant location, features or program modules that are enabled or disabled within the point of sale device, and other suitable initial configuration data.

One exemplary feature or program module that can be enabled or disabled is a debit card program that allows a pin-pad interface to be used so that a personal identification number associated with the debit card can be entered. Another exemplary feature or program module allows credit reversal transactions to be performed, such as if an unwanted purchase is made. Other features or program code modules include those that respond to a card swipe in a card reader by calling an authorization host and loyalty card or frequent buyer card program modules that process such loyalty card or frequent buyer card data.

A second class of data includes modification or update data that is provided to the point of sale devices during operation, such as changes in any of the previously identified types of data. A third class of data includes troubleshooting operations that can be performed to correct disruptions or damage that may have been caused to the point of sale device or software systems. This third class of data can also require analysis of the problem or subsequent re-downloading of the operating system and device specific parameter data. Likewise, if the point of sale device is programmed by an operator, it is possible that improper information could have inadvertently been programmed into the point of sale device when it was initially configured. The troubleshooting functions of terminal management system 102 can include identifying devices for which an operator has improperly entered information and correcting the improper information, such as by providing new data or re-downloading the initial operating system software, application software, configuration data.

Terminal management system 102 includes communications interface 106. Communications interface 106 can interface terminal management system 102 with point of sale systems 104 through 124 over communications medium 110. For example, communications interface 106 can be one or more telephone modems that allow one or more corresponding telephone lines connected to the public switched telephone network to interface with terminal management system 102. Likewise, communications interface 106 can be coupled to the Internet, a local area network, a wide area network, a wireless network, or other suitable communications media. Communications interface 106 can receive and transmit data to each of the point of sale systems 104 through 124, and then assemble the data into predetermined packages for transmission to terminal programming system 108. As used herein, the term couple and its cognate term such as "couples" and "coupled" can include a physical connection (such as through a copper conductor), a virtual connection (such as through randomly assigned memory locations in a data memory device), a logical connection (such as through logical devices of a semiconducting circuit), other suitable connections, or a suitable combination of connections. In one exemplary embodiment, systems and components are coupled to other systems and components through one or more intervening systems or components.

Point of sale systems 104 through 124 can be point of sale devices manufactured by different manufactures that allow electronic payment processes to be performed. For example, point of sale systems 104 through 124 can include stand-alone credit card readers, credit card readers that have been built-in to gas pumps, bank card readers with an associated number pad for entry of a personal identification number, or other suitable point of sale devices. Each point of sale device 104 through 124 includes a processing platform, such as a processor or field programmable gate array, an operating system, application software, configuration data, and additional program modules that allow the point of sale system to receive electronic payment information and to compile the electronic payment information into data messages having a predetermined format for transmission to terminal management system 102.

In one exemplary embodiment, point of sale system 104 includes operating system 112, device application 116, and device data system 120, and point of sale system 124 includes operating system 114, device application 118, and device data system 122, each of which can be implemented in hardware, software, or a suitable combination of hardware and software, and which can be one or more software systems operating on a point of sale device. Operating systems 112 and 114 are point of sale device operating systems that are provided by a manufacturer of a point of sale device, and control the operation of the point of sale device. Device applications 116 and 118 are point of sale device systems that control the device according to user-specified criteria, such as by generating a user-specified screen display, performing user-specified commands, or other suitable user-specified functions. Device data systems 120 and 122 include device specific data, such as a device identifier, a physical address for the device, telephone numbers or network addresses used by the device to transmit data, and other suitable data. These software systems allow each point of sale device to operate according to manufacturer-specified criteria, and also allow users to specify user-selectable functionality and to provide user-specific data.

Terminal programming system 108 is coupled to each point of sale system 104 through 124 by communications interface 106. Communications medium 110 couples point of sale systems 104 through 124 to terminal management system 102. Communications medium 110 can be the public switched telephone network, the Internet, a local area network, a wide area network, a wireless network, or other suitable communications media that allow a plurality of point of sale systems to be coupled to terminal management system 102.

In operation, system 100 allows a plurality of point of sale systems to interface with a terminal management system so as to receive initial programming and programming updates for troubleshooting purposes and for other suitable purposes. Terminal programming system 108 contains operating system software and other configuration data that is transmitted to point of sale systems 104 through 124 from communications interface 106 over communications medium 110. In this manner, a plurality of point of sale systems, including point of sale systems from different manufacturers, can receive terminal programming and operating system software from a single system, rather than being required to access multiple systems.

Terminal programming system 108 can also utilize a separate file of operating system software and configuration data for each point of sale system 104 through 124 instead of from a single database. In this configuration, terminal programming system 108 facilitates the storage, handling, and programming of point of sale systems 104 through 124 by avoiding problems that can result from the failure of referential integrity. For example, it is known that programming of point of sale devices from a single database can result in problems with referential integrity, wherein the resulting data set does not have a unique non-repeating set of elements, and the same address in a terminal operating system can be set for two different instructions. Terminal programming system 108 avoids problems with referential integrity by using separate files of data for each point of sale system 104 through 124. In this manner, template files can be used for each point of sale system that include the base operating system software and configuration for each point of sale system 104 through 124, as sorted by manufacturer. Additional configuration constraints can be imposed on these templates based upon organizational requirements of the business entities that own or offer the point of sale systems 104 through 124, the location of the point of sale devices, the type of credit cards or other electronic payment devices or processes that are used, and other suitable parameters.

For example, a business entity can own point of sale systems manufactured by different manufacturers. In this exemplary embodiment, information specific to that business entity, such as telephone numbers, lists of allowable cards, merchant numbers, addresses, features of the program modules that are enabled or disabled, loyalty card or frequent buyer card features, authorization host features in response to call swipes, credit card reversal of transaction features or other suitable features can be organized according to business entity. Thus, changes required as a result of changes or modifications to any of these features, such as business and entity mergers and acquisitions, merchant number changes, address changes, or other suitable point of sale system 104 through 124 operating system parameters can be implemented by modifying the set of rules or other programming constraints that are used to in turn modify the template operating systems for each point of sale system 104 through 124.

Likewise, back-ups of point of sale system operating software and configuration data can also be made on an individual point of sale system basis such that it is not required to back up the entire database for all point of sale devices. In this manner, problems encountered with updating large databases are avoided. An example of this architecture is shown in TABLE I.

TABLE I

| Terminal 1 | Company X | Manufacturer I   | Card Types A, D, G |
| Terminal 2 | Company X | Manufacturer I   | Card Types A, B, C |
| Terminal 3 | Company X | Manufacturer II  | Card Types C, K    |
| Terminal 4 | Company Y | Manufacturer I   | Card Types I       |
| Terminal 5 | Company Y | Manufacturer III | Card Types A, H    |
| Terminal 6 | Company Y | Manufacturer IV  | Card Types A, B, E |
| Terminal 7 | Company Y | Manufacturer IV  | Card Types H, I, J |
| Terminal 8 | Company Z | Manufacturer II  | Card Types H, K    |

As shown in exemplary TABLE I, devices can be grouped by terminal number, the company that owns or operates them, the manufacturer, the type of cards accepted at each device, or by other suitable data. If the data shown in TABLE I is stored in a single database, then modifications to the data must typically be performed by sorting the table and implementing the changes on the sorted fields, such as by cutting and pasting data into the field, implementing text changes on fields of data, and by other similar manual methods. For example, a change to data for a particular card type can require additional modification for different companies and different device manufacturers, such that a number of different sorting and changing operations must be performed. In this example, the following sequence of events could be required:

1. Sort first field by card type.
2. Sort second field by point of sale device manufacturer.
3. Sort third field by company.
4. Make changes for card data for each company by device manufacturer If a large number of companies and manufacturers are present in the database, then a large number of manual operations must be performed. If the modification procedure is automated, it is possible that large portions of the database could be incorrectly modified or even destroyed if a mistake in programming is made. Furthermore, the entire database must be accessed for such operations such that the database is unavailable for any other uses.

In contrast, the present invention allows programming, methods to be used where the data for each device is stored in a separate file. A set of file modification rules can then be generated and applied to each file individually, without requiring all other files to be isolated while any other given file is being updated. Thus, using the previous example, a set of code could be generated that reads as follows:

If [card, manufacturer, company] then [new value]

The matrix of change values for each combination of card, manufacturer, and company could then be applied to each file individually, such that only one file would be unavailable at any given time. Standard programming techniques can then also be applied to maintain referential integrity of the software and configuration data for each point of sale device, such as to prevent multiple sets of instructions from being assigned to the same data address of any given point of sale device. Likewise, any mistakes in programming can be easily detected and corrected, and such mistakes do not place any unaffected device data files at risk.

In addition, many manufacturers of point of sale systems do not provide a terminal management system for their point of sale devices that allows the point of sale systems to be polled. Instead, each point of sale system must call in to a terminal management system that then updates, provisions, or analyzes the point of sale system to determine whether to provide operating system software or configuration data. System 100 allows polling of point of sale systems regardless of manufacturer, such that a systematic program for verifying the status of point of sale systems can be implemented. This polling features allows updates to all point of sale devices to be performed, and the status of all point of sale systems to be determined, instead of just those selected point of sale systems for which the manufacturer has provided polling functionality.

Operating systems 112 and 114 are point of sale device operating systems provided by different manufacturers and having different architectures and data configurations. For example, operating system 112 may have configuration data stored in a first section of data memory and operating system instructions stored in a second section of data memory, whereas operating system 114 may use different data memory sections for configuration data and operating system instructions. Likewise, the data fields for common configuration data, such as telephone numbers, may be different for operating systems 112 and 114. Thus, provisioning, modifying, or troubleshooting operating systems 112 and 114 from a single database could be difficult or impossible, such as if a common data field of the database must have different numbers or types of characters.

In operation, system 100 is used to program a plurality of point of sale devices. The plurality of point of sale devices 104 through 124 are connected to the terminal programming system 108 by a communications interface 106, which can interface with the public switched telephone network, the Internet, or other suitable communications media. Each of the plurality of point of sale devices can have a different operating system 112 and 114. A different data file containing the operating system software and configuration data for each point of sale device can be used to facilitate management of the plurality of point of sale devices, or other suitable procedures and architectures can be used.

Figure 2:
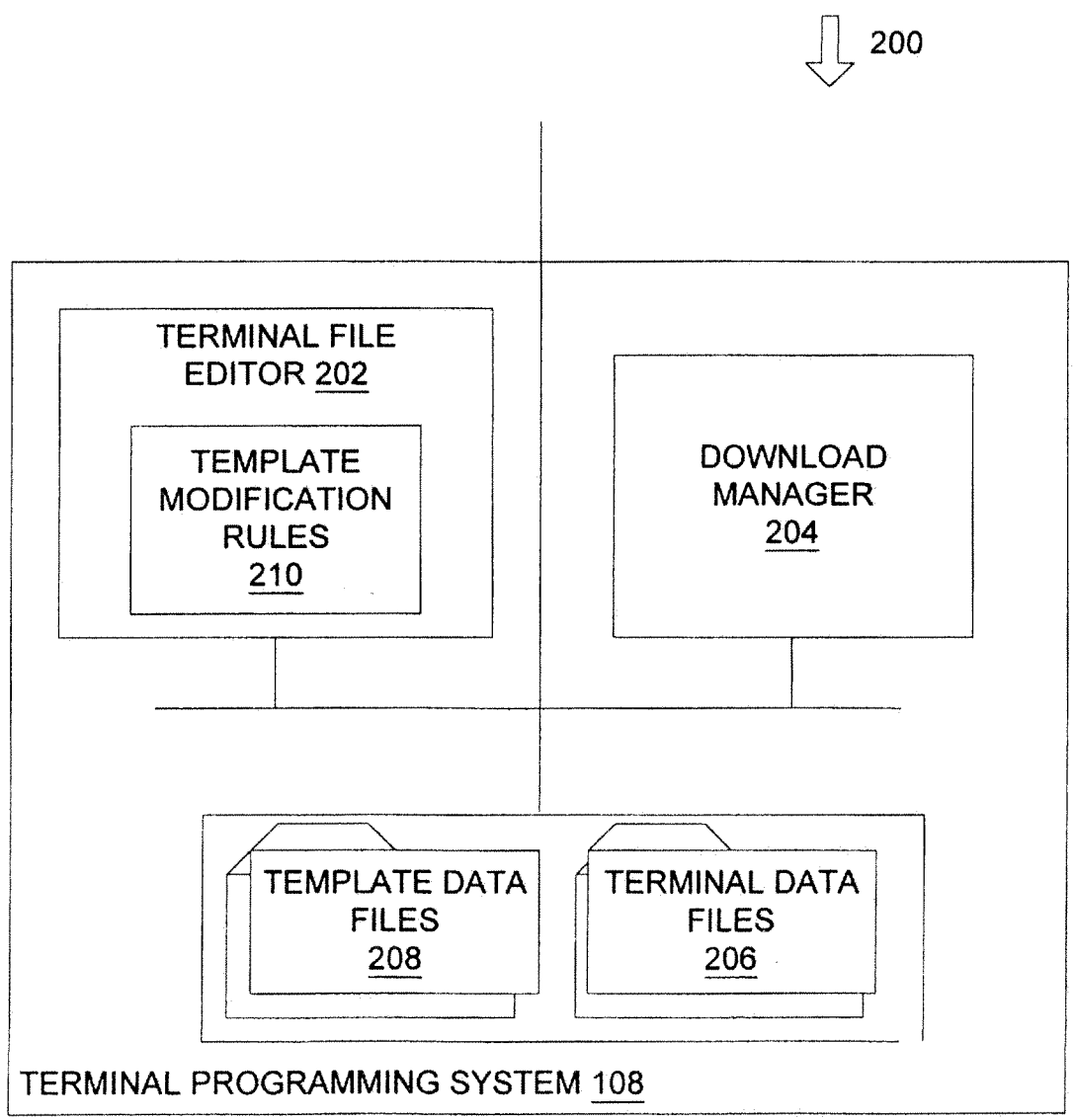
FIG. 2 is a diagram of a terminal programming system in accordance with an exemplary embodiment of the present invention.

FIG. 2 is a diagram of a system 200 in accordance with an exemplary embodiment of the present invention. System 200 includes terminal programming system 108 and additional functionality that allows point of sale devices to be managed and programmed.

System 200 includes device file editor 202, download manager 204, and device data files 206, each of which can be implemented in hardware, software, or a suitable combination of hardware and software, and which can be one or more software systems operating on a general purpose server platform. Device file editor 202 provides a user interface for allowing a user to modify point of sale device operating system software, application software, configuration data, and other suitable data for point of sale devices from different manufacturers. For example, device file editor 202 can interact with device data files 206 to provide the user with a template set of operating system data and configuration data for a standard point of sale device provided by a manufacturer, and can also provide the user with update data and operating system commands that may be required by a business entity, electronic payment card issuing entity, merchant, or other suitable classes of device configuration criteria. Device file editor 202 can then be used to generate a set of rules for each class such that the rules can be applied to each of the corresponding files of point of sale device operating system software, application software, configuration data, and other suitable data.

Download manager 204 controls the provision of operating system software, application software, configuration data, and other suitable data to point of sale devices. For example, download manager 204 can receive device setup data, device update data, or device troubleshooting data and can access device data files 206 to provide the initial operating system software, application software, configuration data, and other suitable data for a point of sale device, the update data that can be required for the point of sale device, updates that are implemented on a system-wide, device-wide, manufacturer-wide, or other basis, or other suitable data. Download manager 204 can also interact with a point of sale device when problems have been encountered with the point of sale device.

For example, if it is determined that an operator may have set up a point of sale device with improper configuration data, download manager 204 can either verify whether the point of sale device has the appropriate configuration data, provide new configuration data to the point of sale device, or use other suitable procedures to correct problems with the point of sale device. Likewise, if the point of sale device is encountering operational problems, download manager 204 can perform diagnostic testing of the point of sale device to determine the cause of the problems and provide predetermined solutions, such as by providing corrected configuration data or providing the correct operating system software, application software, configuration data, and other suitable data.

Device data files 206 include a different data file for each point of sale device, where the data file includes the point of sale device operating system software, application software, configuration parameter data, and other suitable data. Device data files 206 can be separated into multiple file servers and distributed, or can be assembled into a single data file collection as shown in FIG. 2. The multiple file configurations of device data files 206 provide many important advantages over a single database that contains the same information. In order to back-up the single database, it must be secured so that updates are not made during the process of backing up the database. If the database must be continuously available, it might be difficult or impossible to secure the database during back up without causing system operation problems. Likewise, it may be difficult to store the database on multiple servers or in multiple locations across a network. Using a separate file for each terminal or device further allows each file to be backed up in sequence, so that any single file will only be unavailable for a short period of time. The files can also be distributed over multiple file servers, such that access to all files is not interrupted if a single server becomes unavailable.

Template data files 208 can include operating system software, application software, configuration data, and other suitable data for each of the different point of sale devices contained in the plurality of point of sale devices being managed by terminal programming system 108. For example, these files may include programming instructions that identify data that should be stored in predetermined data fields of a memory device of the point of sale device, input and output commands that are recognized by an operating system of each point of sale device, and other suitable data. Template data files 208 can also include predetermined control or variable data fields that allow configuration data to be readily added or modified in each template data file.

Template modification rules 210 can include one or more software applications, objects, agents, lines of code, subroutines, or other suitable software structures that cause template data files 208 to be modified so as to result in a device data file 206. For example, template modification rules 210 can be based on device identification data, device manufacturer, the company that owns or operates the devices, the physical location of the device, the card types or other electronic payment devices or procedures that can be used in conjunction with the point of sale device, and other suitable classes.

In operation, system 200 is used to control the provision of point of sale device operating system software, application software, configuration data, and other suitable data to a plurality of devices, including devices made by different manufacturers. System 200 allows the device software and other point of sale device data to be configured based upon a set of rules such that the inheritance of software and configuration data can be controlled as a function of manufacturer, business entity, application, or other suitable rules.

Figure 3:
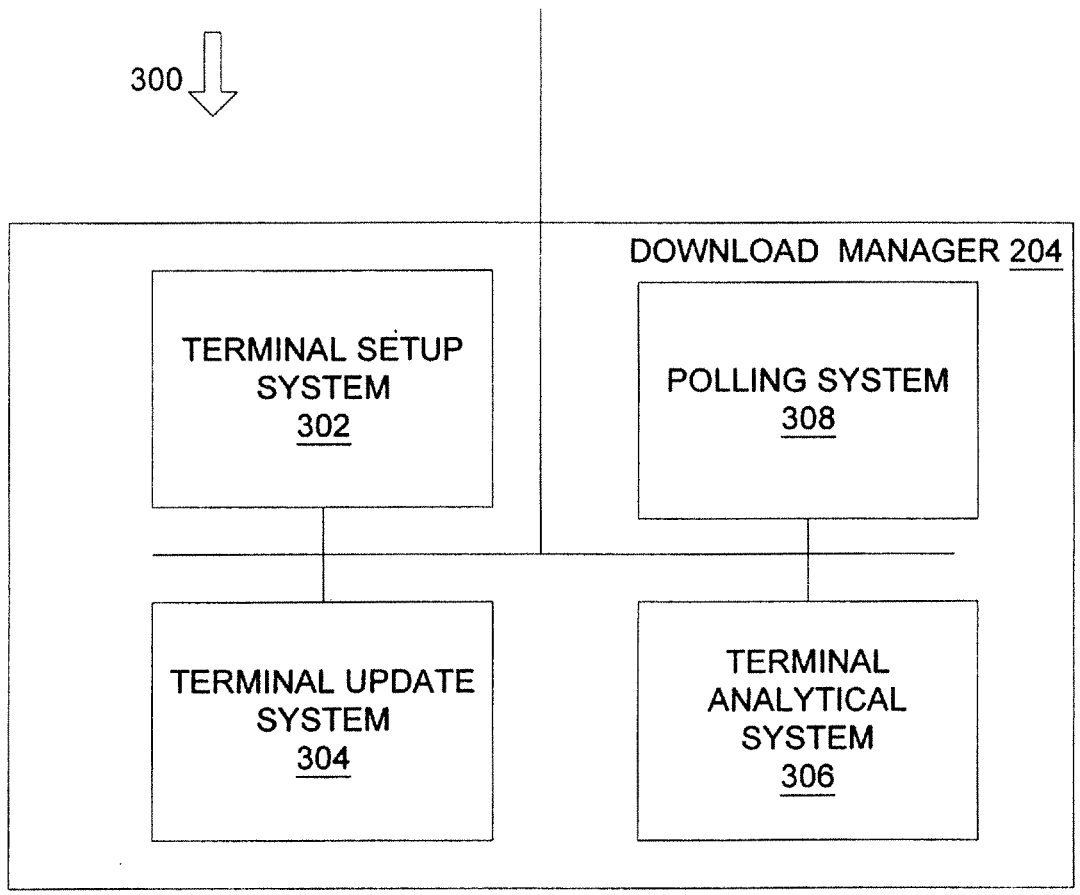
FIG. 3 is a diagram of a system for managing software downloads in accordance with an exemplary embodiment of the present invention.

FIG. 3 is a diagram of a system 300 for managing software downloads in accordance with an exemplary embodiment of the present invention. System 200 includes download manager 204 and additional functionality that allows point of sale device requirements to be determined for point of sale devices manufactured by different manufacturers, and for the correct operating system software and configuration data to be provided.

System 300 includes device setup system 302, device update system 304, and device analytical system 306, each of which can be implemented in hardware, software, or a suitable combination of hardware and software, and which can be one or more software systems operating on a general purpose server platform. Device setup system 302 can receive a query from a point of sale device and provide the setup software and configuration data required by the point of sale termination for operation. For example, device setup system 302 can determine point of sale system requirements based upon the location of the point of sale device, the manufacturer of the point of sale device, the business entity that owns the point of sale device, the credit cards or other electronic credit devices or processes used by the point of sale device, or other suitable data. Device setup system 302 then provides the point of sale device with required operating system software, application software, and configuration data, such as telephone numbers for the point of sale device to call for the provision of payment data, telephone numbers for the point of sale device to call for troubleshooting, telephone numbers for the point of sale to call to receive payment authorization, lists of allowable cards, merchant identification numbers, merchant addresses, or other suitable configuration data.

Device update system 304 can provide operating system software, application software, configuration data and other suitable data to point of sale devices. In one exemplary embodiment, device update system 304 is used to delete or add credit card types, change phone numbers, add software modules or other system functionality, and can perform other suitable update functions. Likewise, device update system 304 can determine the version of software and the last date on which a point of sale device was updated, and can revise or update the software and configuration data for the point of sale device if the date of the last update on the point of sale device is prior to the date of the latest version of operating system software, application software, or configuration data. Other suitable device update procedures can also be implemented by device update system 304.

Device analytical system 306 can interface with point of sale devices so as to resolve problems that may be occurring with the point of sale devices. In one exemplary embodiment, device analytical system 306 transmits control commands and other data to the point of sale device and analyzes data received from the point of sale device to determine if the point of sale device is misoperating. In another exemplary embodiment, device analytical system 306 receives update data for a device from an operator or other source, such as to correct device identification data, phone number data, debit card data, credit card data, or other incorrect data, such as data that has been improperly entered by an operator. Device analytical system 306 then interfaces with the point of sale device at the next point in time when the point of sale device contacts download manager 204. In another exemplary embodiment, device analytical system 306 causes the point of sale device to be contacted, such as by polling, transmission of messages over the Internet, or other suitable methods.

Polling system 308 can contact point of sale devices according to commands received from device setup system 302, device update system 304, and device analytical system 306. For example, polling system 308 can systematically contact all point of sale devices based upon a configuration class, such as device manufacturer, owner, card types used by the device, location, or other suitable configuration classes. Polling system 308 can also contact individual point of sale devices, such as if a problem is detected with the configuration data that was entered into the point of sale device.

In operation, system 300 is used to control the provision of software and configuration data to point of sale devices. System 300 can be configured to respond to queries from the point of sale system, and can likewise interact with each point of sale system in response to external data or other operator-entered commands or other data. In this manner, system 300 coordinates the operation of a plurality of point of sale devices based upon classes, such as business entities that own the point of sale devices; manufacturers of the point of sale devices, locations of the point of sale devices, credit cards used by the point of sale devices, or other suitable classes of data.

Figure 4:
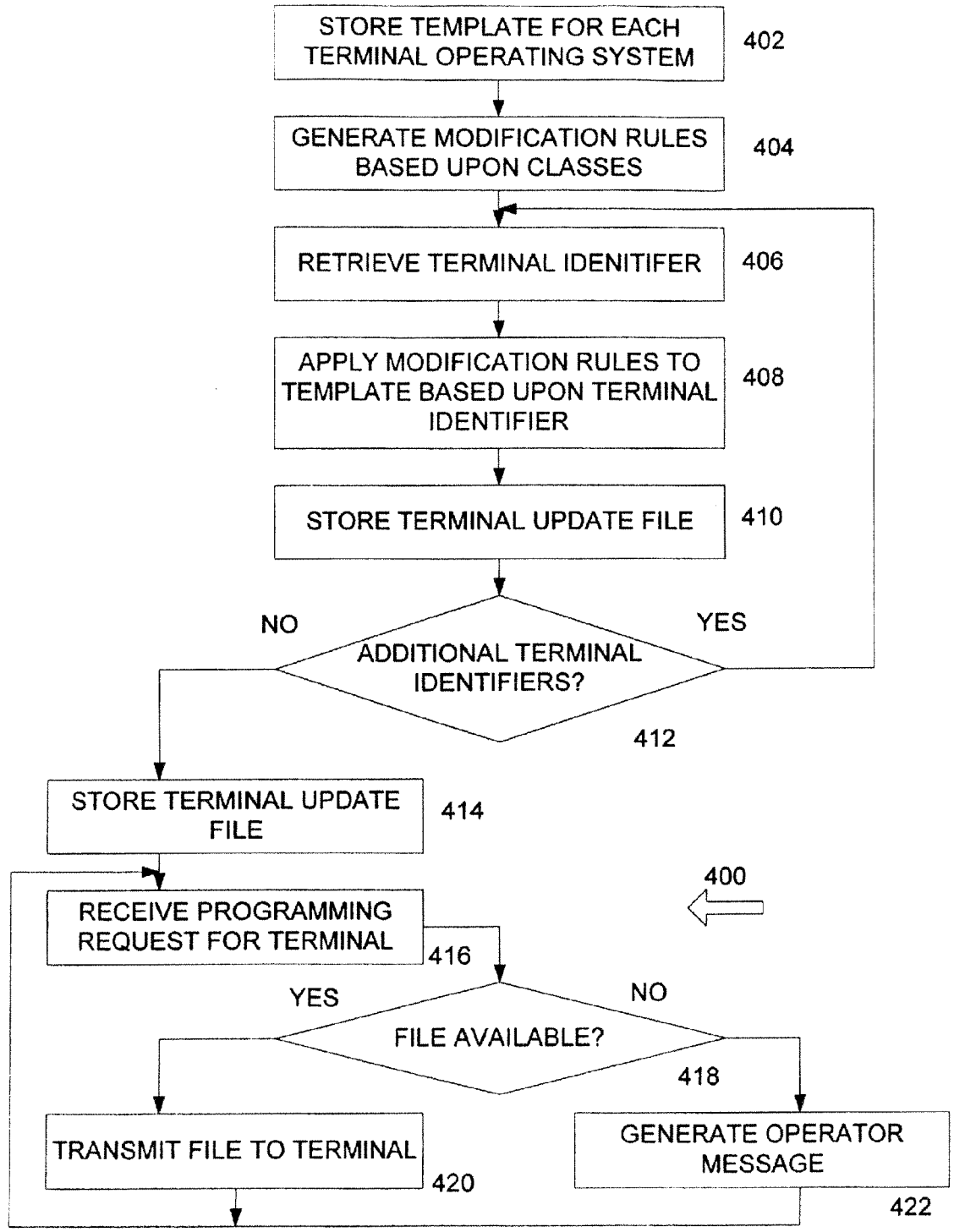
FIG. 4 is a flow chart of a method for programming point of sale devices in accordance with an exemplary embodiment of the present invention.

FIG. 4 is a flow chart of a method 400 for programming point of sale devices in accordance with an exemplary embodiment of the present invention. Method 400 begins at 402 where template data is stored for each device operating system. For example, each point of sale device can include device operating system software that is used to control the operation of the point of sale device, such as: control data for the sequence in which credit card data is read; control data for requests for operator entry of credit card data in the event a credit card number cannot be obtained from the magnetic stripe of the credit card; the telephone numbers that are called to verify the credit card; credit cards that can be processed by the device; reward or frequent buyer cards that are allowed or that can be prompted for; whether or not debit card data can be received; control information for a personal identification number pad for the debit card; the merchant number and device number that is provided when payment data is transmitted for processing; the address of the merchant; the address to which payment data is transmitted, such as an Internet address; or other suitable data. The method then proceeds to 404.

At 404, modification rules are generated based upon classes. A class can include any user-defined set, such as business entities, device manufacturers, credit card organizations, types of point of sale device, telephone numbers used by point of sale devices, or other suitable classes. The modification rules are used to identify device operating systems that require modification, and to further identify the portions of the device data files that will be modified. In this manner, referential integrity and inheritance are preserved, such as by preventing the same address within a device operating system from being provided with two different operating instructions. The method then proceeds to 406.

At 406, a device update file containing operating system software, application software, and configuration data is retrieved, such as from a database that includes files for some or all point of sale devices. The method then proceeds to 408 where modification rules are applied to a template based upon the device identifier. For example, the device identifier can include a manufacture type for the point of sale device, a location, a business entity affiliation, and other suitable information. This data can be used to select one or more modification rules that will be applied to the template data. For example, certain modification rules can apply to point of sale devices that are owned by a certain business entity. Other modification rules can be applied to point of sale devices based upon the manufacturer of the point of sale device. After application of the modification rules to the template based upon the device identifier, the method proceeds to 410.

At 410, the device update file is stored. For example, the device update file can include the operating system software for the point of sale device, application software, and additional configuration data after modification rules have been applied to template data for the point of sale device. Likewise, the device update file can include other suitable data, such as user entered data, recurring data, portions of the point of sale device operating system that do not change but are dictated by physical characteristics or addresses of the point of sale device, or other suitable update data. The method then proceeds to 412.

At 412, it is determined whether additional device identifiers remain that must be processed to generate device update files. If it is determined that such additional device identifiers remain the method returns to 406. Otherwise, the method proceeds to 414.

At 414, the device update files are stored, such as in a back-up data file directory, or other suitable locations. The method then proceeds to 416 where a programming request for a device is received. For example, the programming request can be received from the point of sale device. If an operator of a point of sale device is configuring the point of sale device for first use, the operator can be instructed to dial a predetermined telephone number so that the point of sale device can access the device data file. Likewise, the point of sale device can call in periodically to obtain updates, can call in if device misoperation is detected, or can transmit suitable messages over the Internet or other communications medium such as a local area network or wireless network so as to receive programming request updates. The method then proceeds to 418.

At 418, it is determined whether a file is available for the point of sale device. If it is determined at 418 that no file is available the method proceeds to 422 and an operator message is generated. For example, the operator message can notify the operator of the location of the point of sale device and the absence of an update file for the point of sale device so that the operator can take corrective actions to generate an update file for the point of sale device. If it is determined at 418 that an update file is available the method proceeds to 420 and the update file is transmitted to the device.

In operation, method 400 allows update files for point of sale devices to be created and modified according to classes of rules and further provides for continuous updating of point of sale devices. In this manner, method 400 allows a plurality of point of sale devices to be managed by a single method, even where multiple manufacturers of the point of sale devices exist. Likewise, method 400 coordinates the modification of the point of sale device operating system software, application software, and the configuration of the point of sale devices so that referential integrity is maintained, and allows update files to be modified while point of sale devices are being updated.

Figure 5:
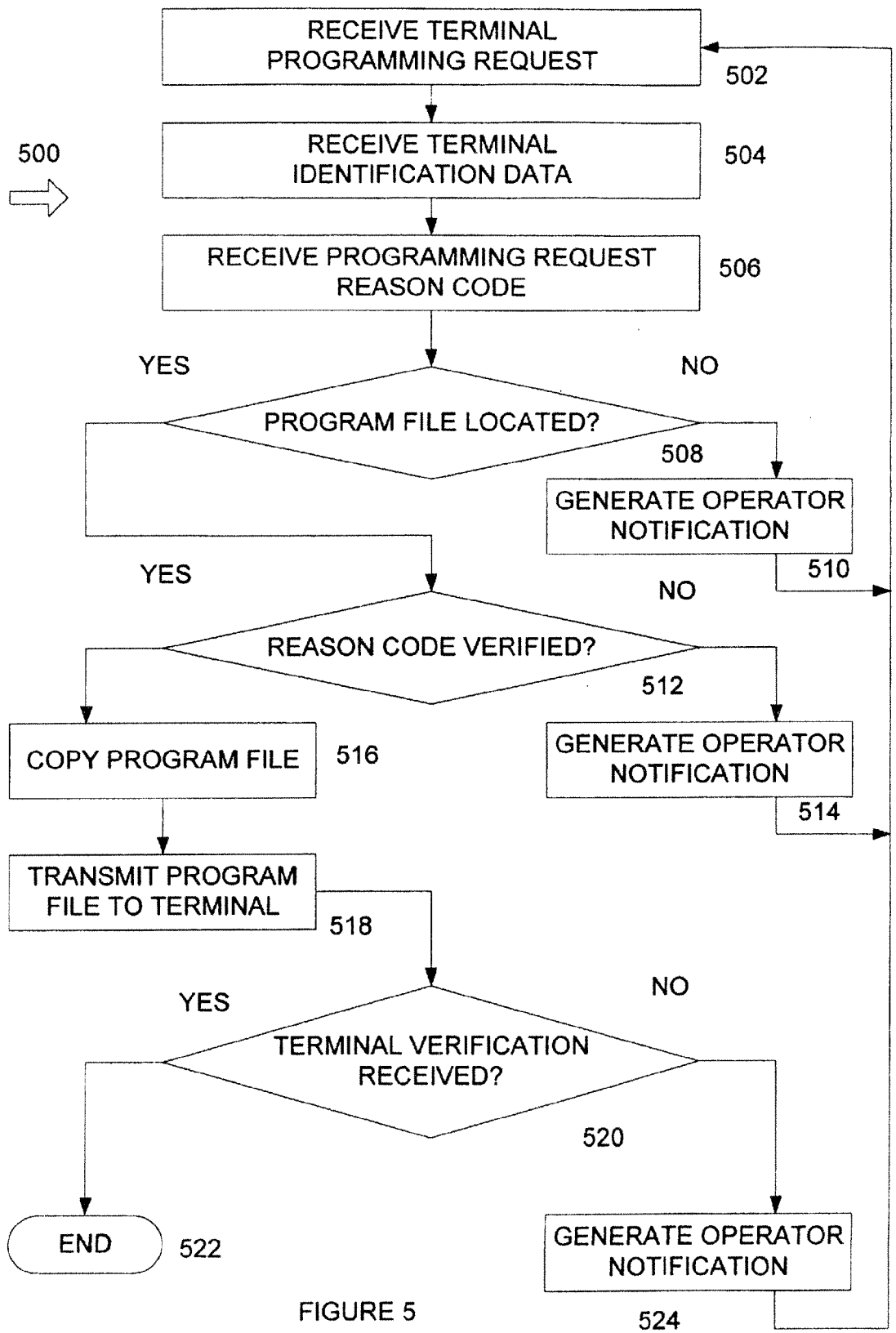
FIG. 5 is flow chart of a method for programming point of sale devices in accordance with an exemplary embodiment of the present invention.

FIG. 5 is flow chart of a method 500 for programming point of sale devices in accordance with an exemplary embodiment of the present invention. Method 500 begins at 502 where a device programming request is received. For example, the device programming request can be received from the point of sale device, from a point of sale device management system such that the point of sale device will be polled with the device programming data, or by other suitable procedures. The method then proceeds to 504.

At 504, device identification data is received. If the device programming request was received from a device management system at 502, the device identification data can be received from a database of the device management system. Likewise, if the device programming request is received from the point of sale device, the device identification data can be received from the point of sale device with the device programming request. Other suitable procedures can be used. After the device identification data is received, then the method proceeds to 506.

At 506, a programming request reason code is received. For example, the programming request reason code can indicate that the programming request is being received as part of initial device configuration for the point of sale device, a point of sale device update, as a result of troubleshooting at the point of sale device, or for other suitable reasons. The method then proceeds to 508.

At 508, it is determined whether a program file has been located for the point of sale device. For example, a program file can be stored in a database along with other program files for all point of sale devices. If it is determined that no program file has been located then the method proceeds to 508 and an operator notification is generated. The method then returns to 502. Otherwise, the method proceeds to 512.

At 512, it is determined whether the reason code has been verified. For example, a point of sale device that has not been configured will not be provided with update data prior to configuration data. Likewise, if a request for troubleshooting has previously been received for a point of sale device and that request has not been processed, then update data might not be provided to that point of sale device. If it is determined that the reason code has not been verified the method proceeds to 514 and an operator notification is generated. Otherwise, the method proceeds to 516.

At 516, the program file for the point of sale device is copied. For example, the program file can be stored in a database with program files for all other point of sale devices, or can be stored in a distributed database such that it is physically located in a separate location from that of most other program files. This program file is copied and stored to a buffer for transmission to the point of sale device. The method then proceeds to 518 where the program file is transmitted to the point of sale device. The method then proceeds to 520.

At 520, it is determined whether device verification has been received. For example, after the device receives the program file, the device can automatically implement the program file and then generate confirmation or verification data that indicates that the program file update has been successful. Likewise, device verification can be generated by the device management system after transmission of the program update, or other suitable device verification can be received. If device verification is received at 520 the method proceeds to 522 and ends. Otherwise, the method proceeds to 524 and operator notification is generated. The method then returns to 502.

In operation, method 500 is used to control the provision of point of sale device software and configuration data. Method 500 allows point of sale devices to obtain configuration data and troubleshooting data from a single source, such that the data is provided to the point of sale devices in a manner that prevents problems with referential integrity and that allows point of sale devices to be continuously updated.

Although preferred and exemplary embodiments of a system and method for programming point of sale devices have been described in detail herein, those skilled in the art will also recognize that various substitutions and modifications can be made to the systems and methods without departing from the scope and spirit of the appended claims.

What is claimed is:

1. A method utilizing automated machines that operate responsive to data to cause financial transfers, wherein each machine includes a card reader, wherein the card reader is operative to read card data from user cards, wherein the card data corresponds to at least one financial account, and wherein each machine is operative to cause financial transfers, comprising:
   (a) storing in at least one data memory through operation of at least one computer, data corresponding to:
      (i) one or more entities which can each have operational responsibility for at least one function of one or more of the automated machines;
      (ii) for each entity, at least one identifier associated with at least one computer program operated in association with at least one automated machine for which the respective entity has operational responsibility;
      (iii) a plurality of templates, wherein each template is operative to provide update changes to at least one computer program; and
      (iv) for each template, at least one identifier associated with the at least one computer program in (iii) to which the respective template is operative to provide update changes;
   (b) receiving through operation of the at least one computer, data corresponding to a first entity;
   (c) determining through operation of the at least one computer at least one template that can be used to make update changes to at least one computer program operated in association with at least one automated machine for which the first entity has operational responsibility; wherein (a) further includes storing in at least one data memory (v) at least one system address from which the at least one template can be downloaded, and wherein in (e) the data corresponding to the at least one template includes at least one electronic message including the at least one system address from which the at least one template can be downloaded.

2. The method according to claim 1 and further comprising (d) communicating to the first entity, data corresponding to the at least one template determined in (c).

3. The method according to claim 1 and further comprising (d) communicating an electronic message to the first entity indicating an availability of at least one template usable by the first entity.

4. The method according to claim 3 wherein (iii) includes storing in the at least one data memory, data representative of a previously unavailable template, and wherein (iv) includes storing in the at least one data memory, data corresponding to an identifier associated with at least one first computer program to which the previously unavailable template can be used to provide update changes, and further comprising (e) determining through operation of the at least one computer that the at least one first computer program operates in association with at least one automated machine for which the first entity has operational responsibility.

5. The method according to claim 4 wherein the communication in (d) indicates an availability of the previously unavailable template and is communicated to the first entity responsive to determination in (e).

6. The method according to claim 5 wherein (b) includes receiving a message from the first entity through operation of the at least one computer.

7. The method according to claim 6 wherein (b) includes the at least one computer communicating a message to the first entity including an address, and wherein in (b) the message from the first entity is received by the at least one computer from the address.

8. The method according to claim 3 and further comprising (e) responsive to data corresponding to the first entity received in (b), delivering electronically to the first entity through operation of the at least one computer, data corresponding to the at least one template determined in (c).

9. The method according to claim 8; wherein in (a) and (e) the at least one system address from which the at least one template can be downloaded comprises an Internet accessible address not associated with the at least one computer.

10. The method according to claim 8 and further comprising (f) downloading the at least one template to the first entity from the address presented in (e).

11. The method according to claim 8 and further comprising (f) downloading the at least one template to the first entity through operation of the at least one computer.

12. The method according to claim 11 and further comprising (g) storing in the at least one data memory through operation of the at least one computer, data indicating that the at least one template has been downloaded by the first entity.

13. The method according to claim 11 and further comprising (g) prior to (f) presenting at least one first message to the first entity through operation of the at least one computer.

14. The method according to claim 13 and further comprising (h) receiving through operation of the at least one computer, at least one message from the first entity.

15. The method according to claim 8 and further comprising (f) storing in the at least one data memory through operation of the at least one computer, data indicating that data concerning the at least one template has been delivered to the first entity.

16. The method according to claim 8 wherein (a) includes receiving through operation of the at least one computer, at least one message from the first entity including data representative of at least one computer program operated in at least one automated for which the first entity has operational responsibility.

17. The method of claim 1 wherein each template is compatible with one computer program of a plurality of computer programs and is incompatible with others of the plurality of computer programs.

18. The method of claim 1 further comprising updating the computer program with a selected template to create a new version of the computer program.

19. The method of claim 1 further comprising:
determining a version of the computer program;
determining a template associated with a newer version of the computer program; and
obtaining the template associated with the newer version of the computer program.

20. The method of claim 1 wherein the computer program is one of a plurality of computer programs, and each of the plurality of computer programs are incompatible with each other.

21. The method of claim 1 wherein the computer program is one of a plurality of computer programs, and each of the plurality of computer programs are compatible with a first subset of the templates and are incompatible with a second subset of the templates.

22. A method utilizing automated machines configured to cause financial transfers, wherein each machine includes a card reader that is configured to read card data from user cards, wherein the card data corresponds to at least one financial account and wherein each machine is configured to use the card data to process financial transfers, comprising:

(a) storing in at least one data memory through operation of at least one computer, data corresponding to:
  (i) one or more entities, each associated with at least one function of one or more of the automated machines;
  (ii) for each entity, at least one identifier associated with at least one computer program operated in association with at least one automated machine;
  (iii) a plurality of templates, wherein each template is operative to provide update changes to the at least one computer program; and
  (iv) for each template, at least one identifier associated with the at least one computer program in (iii) to which the respective template is operative to provide update changes;
(b) receiving through operation of the at least one computer, data corresponding to a first entity;
(c) determining through operation of the at least one computer at least one template that can be used to make update changes to at least one computer program operated in association with at least one automated machine for which the first entity has operational responsibility;
wherein (a) further includes storing in at least one data memory (v) at least one system address from which the at least one template can be downloaded, and wherein in (e) the data corresponding to the at least one template includes at least one electronic message including the at least one system address from which the at least one template can be downloaded.

* * * * *